(12) United States Patent
Gentille

(10) Patent No.: US 8,419,071 B2
(45) Date of Patent: Apr. 16, 2013

(54) PIPE CONNECTOR PRODUCTION METHOD

(75) Inventor: Alain Cornut Gentille, Saint Wandrille-Rançon (FR)

(73) Assignee: Technip France (FR)

( * ) Notice: Subject to any disclaimer, the term of this patent is extended or adjusted under 35 U.S.C. 154(b) by 208 days.

(21) Appl. No.: 12/677,346

(22) PCT Filed: Sep. 8, 2008

(86) PCT No.: PCT/FR2008/001250
§ 371 (c)(1),
(2), (4) Date: Apr. 28, 2010

(87) PCT Pub. No.: WO2009/066026
PCT Pub. Date: May 28, 2009

(65) Prior Publication Data
US 2010/0207381 A1    Aug. 19, 2010

(30) Foreign Application Priority Data

Sep. 10, 2007  (FR) .................................... 07 06320

(51) Int. Cl.
*F16L 17/00* (2006.01)
(52) U.S. Cl.
USPC ................. 285/97; 285/294.3; 285/222.1
(58) Field of Classification Search ............... 285/294.3, 285/222–222.5, 286.1, 290.1–290.3, 294.4, 285/295.1, 295.3, 97, 346
See application file for complete search history.

(56) References Cited

U.S. PATENT DOCUMENTS

| | | | | |
|---|---|---|---|---|
| 1,586,923 A * | 6/1926 | Townsend | .................... | 166/77.4 |
| 2,083,842 A * | 6/1937 | Henning | ............................ | 285/3 |
| 2,386,865 A * | 10/1945 | Jewell | ............................... | 285/22 |
| 3,023,995 A * | 3/1962 | Hopkins | ........................... | 251/5 |
| 3,258,271 A | 6/1966 | Hollingsworth | | |
| 3,325,195 A * | 6/1967 | Margis | ......................... | 285/294.4 |
| 3,415,545 A * | 12/1968 | Frey | .............................. | 285/222.1 |
| 3,420,554 A * | 1/1969 | Straub | .............................. | 285/97 |
| 3,739,460 A * | 6/1973 | Addis et al. | ..................... | 29/516 |
| 3,764,037 A * | 10/1973 | Rothrock | ....................... | 220/233 |
| 3,810,665 A * | 5/1974 | Rodgers | .......................... | 285/97 |
| 3,860,271 A * | 1/1975 | Rodgers | .......................... | 285/97 |
| 3,977,704 A * | 8/1976 | Meyer | .............................. | 285/27 |
| 4,153,280 A * | 5/1979 | Bunyan | ........................... | 285/97 |

(Continued)

FOREIGN PATENT DOCUMENTS

DE     107 882 C    4/1898
FR     1 065 294 A  5/1954

(Continued)

OTHER PUBLICATIONS

International Search Report dated May 12, 2009, issued in corresponding international application No. PCT/FR2008/001250.

*Primary Examiner* — Aaron Dunwoody
(74) *Attorney, Agent, or Firm* — Ostrolenk Faber LLP

(57) ABSTRACT

The invention relates to the production of a connector intended for a pipe, including an end piece which is mounted to the end of a pipe. The connector includes a sleeve covering said pipe end in order to crimp same onto the mounting end. According to the invention, the sleeve includes an annular chamber, while the armoring wires have free ends which are folded back against the outer polymer sheath, said sealed annular chamber surrounding the aforementioned pipe end. The annular chamber is then dilated with the injection of a fluid in order to maintain the free ends engaged between the outer polymer sheath and the sleeve.

19 Claims, 1 Drawing Sheet

U.S. PATENT DOCUMENTS

| | | | | |
|---|---|---|---|---|
| 4,162,093 A | * | 7/1979 | Sigmund | 285/47 |
| 4,216,981 A | * | 8/1980 | Jensen | 285/97 |
| 4,387,899 A | * | 6/1983 | Dahlberg | 277/605 |
| 4,630,648 A | * | 12/1986 | McCord | 138/103 |
| 4,676,531 A | * | 6/1987 | Martin | 285/96 |
| 4,786,087 A | * | 11/1988 | Thewlis et al. | 285/97 |
| 5,133,561 A | * | 7/1992 | Hattori et al. | 277/646 |
| 5,333,916 A | * | 8/1994 | Burkit et al. | 285/97 |
| 6,673,318 B1 | * | 1/2004 | Nishimura | 422/522 |

FOREIGN PATENT DOCUMENTS

| | | |
|---|---|---|
| FR | 2 381 227 A | 9/1978 |
| FR | 2 828 722 | 2/2003 |
| GB | 709 398 A | 5/1954 |
| GB | 2 156 031 A | 10/1985 |
| WO | WO 00/39495 A | 7/2000 |
| WO | WO 2004/068016 | 8/2004 |

* cited by examiner

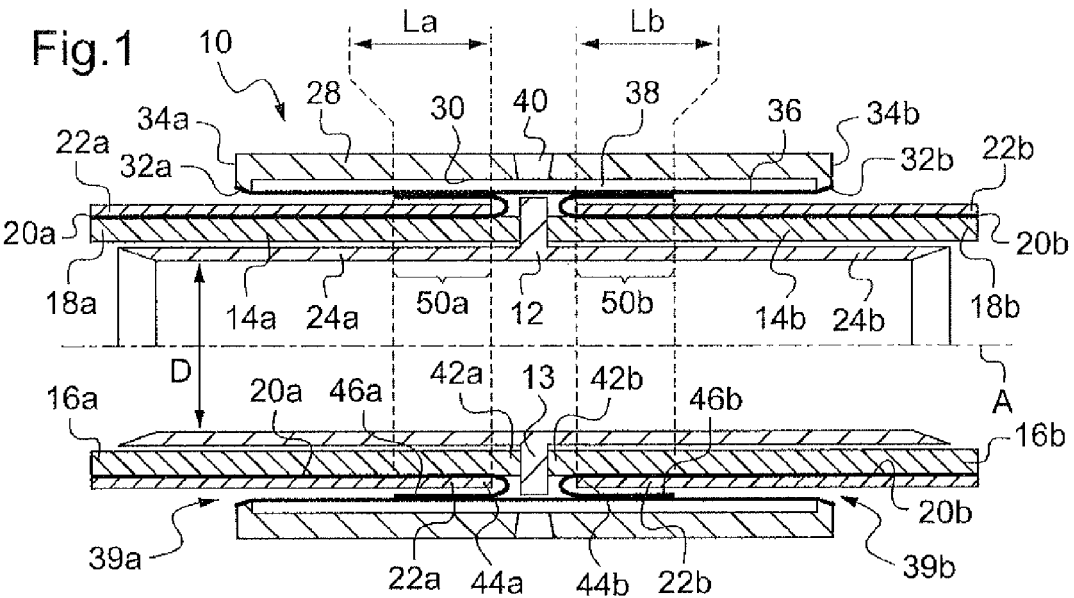
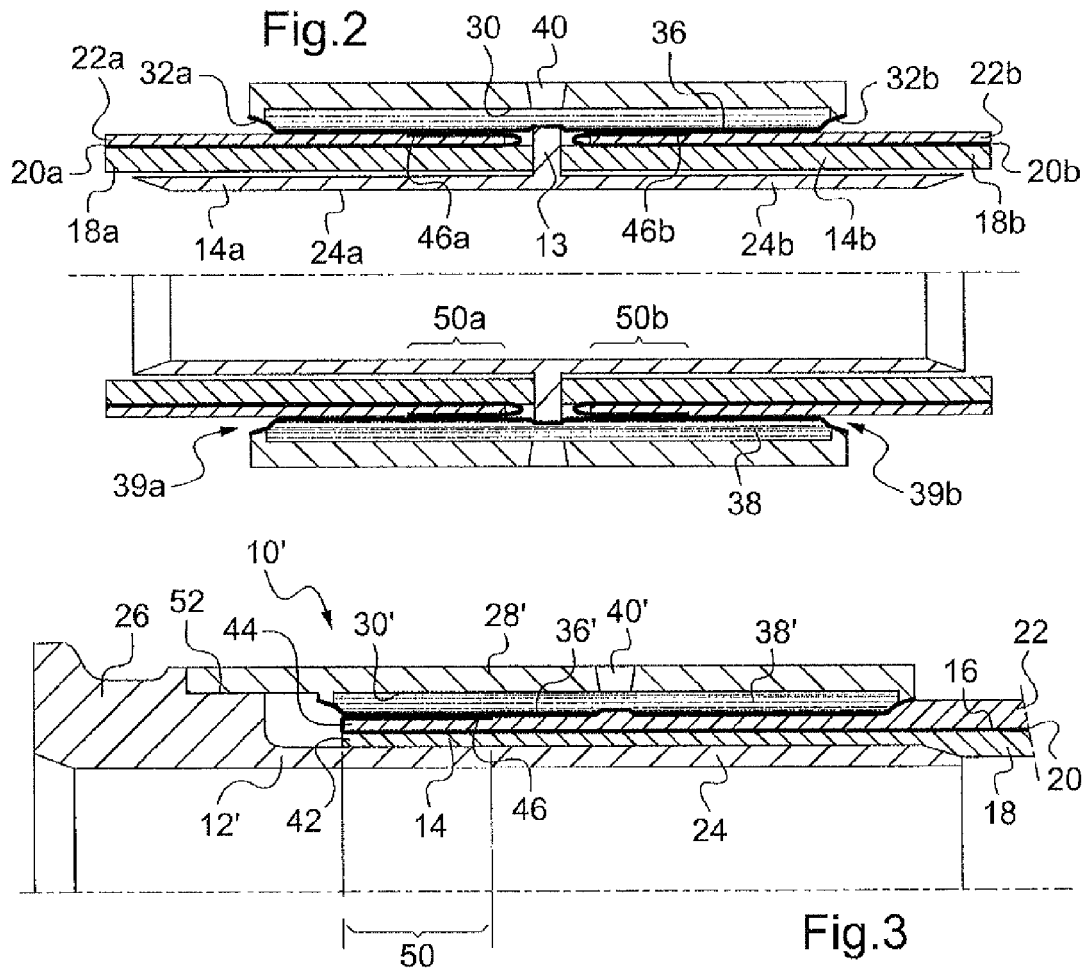

PIPE CONNECTOR PRODUCTION METHOD

CROSS REFERENCE TO RELATED APPLICATION

The present application is a 35 U.S.C. §§371 national phase conversion of PCT/FR2008/001250, filed 8 Sep. 2008, which claims priority of French application Ser. No. 07/06, 320, filed 10 Sep. 2007, the disclosure of which is incorporated by reference herein. The PCT International Application was published in the French language.

BACKGROUND OF THE INVENTION

The present invention pertains to a method of mounting a nipple on a flexible tubular pipe end and also, to a connector comprising said tubular pipe end and the nipple mounted according to the method.

The flexible tubular pipes concerned are better known as "RTPs" (for Reinforced Thermoplastic Pipes) and they are used for land-based (or "on-shore") applications for transporting hydrocarbons or water under pressure. They have the advantage of being faster to install and more resistant to corrosion than rigid steel pipes. Their inner diameter is relatively small, lying for example between 50 and 200 mm, and the transported fluid is at a pressure generally lying between 50 and 200 bar and at a temperature which may reach as much as 80° C.

The structure of these pipes is relatively simple and inexpensive. They comprise from the inside to the outside an inner polymeric tube made of polymer, an armor generally made of composite materials and an outer polymeric sheath. The inner polymeric tube has a leaktightness function in relation to the fluid transported by the pipe. It is generally made of high-density polyethylene. The function of the outer polymeric sheath, which is in particular made of polyethylene, is to protect the armor.

The function of the armor is to take up the mechanical loads, in particular those related to the pressure of the transported fluid. The armor generally consists of at least one pair of crossed plies of helically wound threads. The two overlaid plies constituting each pair of plies are oppositely wound with helix angles that are substantially equal in absolute value, so as to balance the structure in torsion. This helix angle is advantageously of the order of 55°, so as to take up the axial tensile loads and also the radial loads related to the pressure of the fluid. In most cases, the armor comprises only two overlaid layers, namely a pair of crossed plies of armor threads wound at 55°. When the diameter of the pipe and the service pressure are high, it may be necessary and advantageous to add a second pair of crossed plies of armor threads, so that the armor then comprises four overlaid layers. The threads of the armor plies consist for example of fibers of aramid, carbon, glass or polyester.

The document FR2828722 describes an exemplary "RTP" pipe in which the armor threads are textile strips strengthened with Kevlar® fibers. The document WO2004/068016 presents another example in which the armor threads consist of glass fibers.

The pipes to which the present invention is pertinent are said to be of unbonded type since their various constituent layers are substantially free to slip with respect to one another when the pipe is flexed.

One of the drawbacks of these pipes is the cost of their connection. Indeed, in order to be connected these pipes are equipped at their end with a nipple, and the costs of this nipple added to the costs of mounting are relatively significant by comparison with the cost of the bare pipes.

A method of mounting a nipple at the end of a flexible tubular pipe so as to produce a connector is for example described in the document FR 2 754 585. The nipple comprises a connection end and, opposite therefrom, a mounting end intended to be fitted into the end of said pipe. Said connector also comprises a sleeve which shrouds the pipe end so as to clamp the tubular pipe end onto said mounting end. Accordingly, the inner diameter of the mounting end is deformed and increased by force by implementing a technique dubbed tube expansion, said technique consisting in forcibly introducing and displacing a tube expander inside and along said mounting end, said tube expander having an outside diameter greater than the initial inside diameter of said mounting end. The effect of this operation is to compress the walls of the end of the pipe inside the sleeve. Thereafter, in order to perfect this mounting, the outer diameter of the sleeve is deformed and reduced by force by implementing a drawing technique. This results in a tightening or clamping of the end of the pipe between on the one hand the mounting end of the nipple and on the other the sleeve, said clamping ensuring the functions of mechanical joining and leaktightness. This solution exhibits the drawback of requiring relatively sizeable and expensive specialized tooling to carry out the tube-expansion and drawing operations. Moreover, it is necessary to provide for a relatively sizeable length of pipe end held tight between the sleeve and the nipple so that, under extreme conditions, the nipple does not become detached from the end of the pipe. Consequently, the cost of the materials used to produce the nipple is correspondingly increased.

SUMMARY OF THE INVENTION

Hence, a problem that arises and which the present invention is aimed at solving is to devise a method of mounting a nipple on a pipe so as to produce a connector which is not only of an advantageous cost but also which can withstand extreme conditions of use.

With the aim of solving this problem, and according to a first aspect, the invention proposes a method of mounting a nipple on a flexible tubular pipe end. The method comprises providing a flexible tubular pipe comprising an inner polymeric tube, an armor around said inner polymeric tube and an outer polymeric sheath around said armor, said armor comprising armor threads wound around said inner polymeric tube. Thereafter a nipple is provided comprising a mounting end intended to be fitted into the end of the pipe. Then a sleeve is provided, which is suitable for shrouding the pipe end so as to clamp the pipe end onto the mounting end. According to the invention, a deformable leaktight annular chamber is formed inside the sleeve. The chamber is intended to surround the pipe end. Then the armor is cropped at the pipe end so as to release free ends of armor threads and to fold back the free ends of armor threads against the outer polymeric sheath before shrouding the pipe end with the sleeve. Finally, a pressurized fluid is injected into the annular chamber to expand the annular chamber and hold the free ends of armor threads gripped between the outer polymeric sheath and the sleeve.

Thus, a characteristic of the invention resides both in the mode of preparation of the tubular pipe end and in the mode of clamping of the pipe end onto said mounting end by way of the deformable leaktight annular chamber. Indeed, free ends of armor threads are released at least partially by cropping, so that these free ends of armor threads can thereafter be folded back at 180° against the outer polymeric sheath, and thereafter the pipe end is engaged inside the sleeve and inside the deformable leaktight annular chamber. Then, finally, the annular chamber is expanded, it then extending in an annular space lying between the outer polymeric sheath and the sleeve and hence, it compresses not only the outer polymeric sheath but also the free ends of armor threads.

In this way, these free ends of armor threads will be wedged between the outer polymeric sheath and the sleeve which shrouds the pipe end. Consequently, the inner polymeric tube, the armor, the outer polymeric sheath and the folded-back free ends of armor threads will be sandwiched between the outer wall of the mounting end of the nipple and the inner wall of the sleeve, respectively. It will be noted that the mounting end of the nipple and the sleeve being rigid, the expanded leaktight annular chamber tends to substantially squeeze the wall of the pipe. Thus, the outer polymeric sheath and the armor in particular, which according to the prior art were not bonded together and whose relative slippage during movements of the pipe was a cause of detachment of the nipple, are, by virtue of the method which is the subject of the invention, held in a fixed position with respect to one another at the level of the end of the pipe by virtue of the free ends of armor threads folded back at 180° against the outer polymeric sheath. Indeed, the free ends of armor threads emerge from inside the outer polymeric sheath, and they are then curved back against the free edge of this sheath and thereafter applied against the outside surface of this sheath. Folded back in this way, the free end of these armor threads is securely attached to the outer polymeric sheath when the pipe end is clamped between the sleeve and the mounting end of the nipple by virtue of the expansion of the leaktight annular chamber.

Thus, cumbersome and expensive specialized tooling may be dispensed with by virtue of the mounting method in accordance with the invention, since it suffices to inject a pressurized fluid inside the deformable leaktight annular chamber of the sleeve, and this may be done with the aid of a simple hand pump. Moreover, the length of the mounting end of the nipple and symmetrically that of the sleeve, can be significantly reduced, since a smaller length of pipe end can be clamped, by comparison with the prior art, while preserving the required resistance to stripping of the nipple and the required leaktightness.

The armor advantageously comprises at least one pair of overlaid crossed plies of armor threads wound with a helix angle whose absolute value lies between 52° and 58°, advantageously between 54° and 56° and preferably equal to 55°. This optimum angle substantially equal to 55° affords the pair of crossed plies of armor thread the ability to take up the axial tensile loads and also the radial loads related to the pressure of the fluid.

The armor threads can be metallic but composite or woven materials based on high-toughness fibers of the aramid, glass, polyester or carbon type will be preferred. Such threads made of composite materials exhibit, for equal tensile strength, markedly lower weight and flexural stiffness than those of equivalent metal wires. These advantages make it possible to reduce the weight of the pipe and to facilitate its manufacture and its installation.

According to a particularly advantageous mode of implementation of the invention, an initially viscous material suitable for setting hard after injection is injected under pressure into said annular chamber. In this way, though the leaktightness of the deformable annular chamber in relation to the injected fluid is absolutely necessary at the precise instant of injection, after solidification, leaktightness is relatively secondary since the material then forms an undeformable rigid mass. Thus, the transformations which could occur on the sleeve after mounting the nipple, and in particular the stresses which could impair the deformable annular chamber, would have no effect on the clamping of the pipe end. Advantageously, a cross-linkable polymer material is injected into the deformable annular chamber, which material is initially relatively viscous but can nonetheless be injected under pressure into the deformable leaktight annular chamber, and which above all cross-links and hardens after injection to become a solid annular element. It will be possible in particular to choose a polymer material of two-component type which makes it possible to obtain rapid hardening of the material and which exhibits significant hardness. The rapidity of hardening is a significant parameter since it conditions the time for which the pressure of the fluid material in the annular chamber will have to be maintained. An epoxy resin will be chosen for example as polymer material.

According to a particular embodiment of the invention, an annular strip of deformable material is mounted inside said sleeve to form a deformable leaktight annular chamber. The annular strip exhibits two opposite circular edges and the sleeve an inner cylindrical surface, the two opposite circular edges being secured to the inner cylindrical surface in a leaktight manner. Thus, the deformable leaktight annular chamber is formed by that portion of inner surface of the sleeve which is covered by the annular strip and by the annular strip itself. The latter being deformable, by injecting a fluid under pressure between the inner surface of the sleeve and the annular strip, it tends to deform radially as will be explained in the detailed description which will follow.

Advantageously, there is provided a nipple furthermore comprising another mounting end opposite from said one mounting end and there is furthermore also provided another pipe exhibiting another pipe end, said other mounting end being fitted into said other pipe end, while said sleeve shrouds said pipe ends. Thus, such a nipple makes it possible to connect together two pipe ends in a completely symmetric manner and relatively rapidly. Indeed, the preparation of the two pipe ends is completely analogous and identical to the preparation of a single pipe end such as described above. A nipple which exhibits two mutually opposite and substantially symmetric mounting ends is provided simply and the mounting ends are fitted respectively into the pipe ends. Next, the two fitted pipe ends are shrouded with one and the same sleeve equipped with one and the same deformable leaktight annular chamber. And finally, in a manner completely analogous to the previous mode of implementation, a fluid is injected under pressure into the deformable leaktight annular chamber, causing the deformation and the expansion of the deformable leaktight annular chamber and clamps the two pipe ends respectively onto the two mounting ends of the nipple.

According to another aspect, the present invention proposes a flexible tubular pipe connector comprising a nipple mounted at the end of a flexible tubular pipe, said pipe comprising an inner polymeric tube, an armor around said inner polymeric tube and an outer polymeric sheath around said armor, said armor comprising armor threads wound around said inner polymeric tube, said nipple comprising a mounting end intended to be fitted into the end of said pipe, said connector furthermore comprising a sleeve suitable for shrouding said pipe end so as to clamp said pipe end onto said mounting end; according to the invention, said sleeve furthermore comprises a deformable leaktight annular chamber situated inside said sleeve, while said armor threads exhibit free ends which extend from said outer polymeric sheath and which are folded back against said outer polymeric sheath, said leaktight annular chamber surrounding said pipe end; and said leaktight annular chamber being expanded by injecting a pressurized fluid into said leaktight annular chamber so as to hold said free ends of armor threads gripped between said outer polymeric sheath and said sleeve.

Thus, a characteristic of the invention resides at one and the same time in the mode of preparation of the tubular pipe end and in the mode of clamping of the pipe end onto said mounting end by way of the deformable leaktight annular chamber. In this way, a flexible tubular pipe connector is obtained at an advantageous cost in contradistinction to the pipe connectors obtained according to the prior art. Advantageously, said pressurized fluid is a hardenable material which sets hard in said leaktight annular chamber after having been injected. It thus forms an undeformable annular rigid mass, which compresses the pipe end concentrically between the sleeve and the mounting end. Preferably, said hardenable material is a cross-linkable polymer material.

According to an advantageous mode of implementation of the invention, said sleeve exhibits an inner surface, said sleeve comprises an annular strip of deformable material mounted inside said sleeve, and said annular strip and said inner surface of said sleeve form said leaktight annular chamber. Accordingly, said annular strip of deformable material exhibits two opposite circular edges, said two circular edges being held in a leaktight manner against said inner surface, for example by means of a seal or else by welding. Advantageously, said annular strip is made of a copper alloy, particularly one that is malleable, so as to deform under the pressure of the injected fluid and to hug the contours of the outer surface of the outer polymeric sheath against which the free ends of armor threads are folded back.

Preferably, said nipple furthermore comprises another mounting end opposite from said one mounting end so as to be able to connect two pipe ends that face one another, said other mounting end being fitted into the other pipe end, while said sleeve shrouds said pipe ends. Thus, one and the same sleeve of a length substantially equivalent to the length of the two aggregate mounting ends makes it possible, by virtue of a deformable leaktight annular chamber extending over the entire length of the sleeve, to clamp the two pipe ends together.

Other features and advantages of the invention will emerge on reading the description hereinafter of particular embodiments of the invention, given by way of nonlimiting indication, with reference to the appended drawings in which:

BRIEF DESCRIPTION OF THE DRAWINGS

FIG. 1 is a schematic axial sectional view of a flexible tubular pipe connector in accordance with the invention, according to a first mode of implementation and in a first position;

FIG. 2 is a schematic axial sectional view of the connector illustrated in FIG. 1 in a second position; and FIG. 3 is a partial schematic axial sectional view of a flexible tubular pipe connector according to a second mode of implementation.

DESCRIPTION OF PREFERRED EMBODIMENTS

FIG. 1 shows a connector 10 comprising a nipple 12 with axis of symmetry A, linking two ends 14a and 14b of flexible tubular pipe 16a, 16b. These flexible tubular pipes 16a, 16b comprise respectively an inner polymeric tube 18a, 18b, around which is wound an armor layer 20a, 20b, of armor threads, this same armor layer 20a, 20b being covered with an outer polymeric sheath 22a, 22b for protection. The armor threads are for example made of aramid, and for example of Kevlar®. The nipple 12 exhibits two mounting ends 24a and 24b which are mutually symmetric with respect to a bush 13, and respectively fitted into the inner tubes 18a and 18b as far as the bush 13. Furthermore, the connector 10 comprises a sleeve 28 which extends concentrically around the mounting ends 24a and 24b and which is centered with respect to the bush 13. The sleeve 28 exhibits an inner surface 30, delimited by two inner annular rims 32a and 32b opposite one another and situated respectively at the edge of the two ends 34a and 34b of the sleeve 28. Furthermore, the sleeve is equipped with an annular strip 36 of copper alloy whose two opposite circular edges are linked in a leaktight manner respectively to the two inner annular rims 32a and 32b. Thus, the annular strip 36 and the sleeve 28 inner surface 30 define a deformable leaktight annular chamber 38, while the sleeve 28 and the two mounting ends 24a and 24b define respectively an annular space 39a, 39b able to receive the ends 14a, 14b without radial compression in this first position illustrated in FIG. 1. Moreover, the sleeve exhibits a filling orifice 40 situated substantially square with the bush 13 the role of which will be explained subsequently in the description.

Furthermore, the inner polymeric tube 18a, 18b, respectively of the two ends 14a and 14b, exhibits a free inner edge 42a, 42b whereas the outer polymeric sheath 22a, 22b exhibits a free outer edge 44a, 44b; the two free edges 42a, 42b; 44a, 44b then extending substantially edge to edge, while the armor 20a, 20b exhibits free ends 46a, 46b of armor threads which extend beyond the gap between free edges 42a, 42b; 44a, 44b and which are folded back around the outer polymeric sheath 22a, 22b over an axial length La, Lb, starting from the free outer edge 44a, 44b. The axial length La, Lb lies substantially between half the inner diameter D of the nipple 12 and two thirds of this inner diameter D. Advantageously, the free ends 46a, 46b of armor threads are folded back against the outer polymeric sheath 22a, 22b and are held there by virtue of an adhesive strip wound around the end 14a, 14b and which imprisons them. Quite obviously, the two ends 14a and 14b of flexible tubular pipe 16a, 16b are thus prepared before being fitted respectively onto the two mounting ends 24a and 24b.

After having thus installed the ends 14a, 14b of flexible pipes 16a, 16b, a polymer of epoxy type in the liquid phase is injected under pressure into the deformable leaktight annular chamber 38 by way of the filling orifice 40 and of an appropriate pump. This polymer of epoxy type is in reality thus named loosely speaking. In reality the liquid material contains an epoxy monomer and a cross-linking agent for example of amine type, which has been mixed in a homogeneous manner into the monomer just before injection.

FIG. 2 depicts all the elements illustrated in FIG. 1, except that the deformable leaktight annular chamber 38 has been lined with the aforesaid polymer material and consequently the deformed annular strip 36. Only the elements to which the expansion of the deformable leaktight annular chamber 38 is directly pertinent have been referenced here so as not to overload the figure. Thus, the monomer and its cross-linking agent have therefore been injected under pressure through the filling orifice 40 and this has caused an expansion of the deformable leaktight annular chamber 38 and more precisely a deformation of the annular strip 36 of copper alloy in particular at the level of the inner annular rims 32a and 32b where it has stretched. The annular strip 36, by virtue of the pressure exerted by the epoxy mixture, has therefore been parted radially from the inner surface 30 so as to extend into the annular spaces 39a and 39b, and compress respectively against the mounting ends 24a and 24b, and free parts 50a, 50b of the pipe ends 14a, 14b. These free pipe parts 50a, 50b consist respectively and successively of the inner polymeric tube 18a, 18b, of the armor layer 20a, 20b, of the outer polymeric sheath 22a, 22b and of the free ends 46a, 46b of armor threads 20a, 20b, Furthermore, the pressure of the epoxy mixture has been maintained in the deformable leaktight annular chamber 38, either by virtue of an anti-return valve mounted on the filling orifice 40, or quite simply by maintaining the pressure of the aforesaid pump, until the mixture sets hard and forms a fully cross-linked and hardened polymer.

Said free parts 50a, 50b of the pipe ends 14a, 14b are thus clamped between the mounting ends 24a and 24b and the annular strip 36 of the leaktight annular chamber 38. The annular strip 36, by virtue of its ductility, then hugs the anfractuosities and the asperities of the outer sheaths 22a, 22b, of the free ends 46a, 46b of armor threads 20a, 20b and of the joint at the level of the bush 13 of the nipple 12. In this way, the two ends 14a and 14b of flexible tubular pipe 16a, 16b are linked together in a leaktight manner and are securely tied together, even should they be stretched in two opposite directions.

Reference will now be made to FIG. 3 to illustrate a second mode of implementation of the invention. In this figure, the elements having the same functions as those of the elements illustrated in the previous figures comprise the same reference, either labeled with a prime sign "'", or divested of the letter which accompanies it. Thus there is shown a connector 10' comprising a nipple 12' which exhibits a single mounting end 24. On the other hand, the nipple 12' exhibits a connection end 26 terminating in a fixing flange and it is linked to a single end 14 of flexible tubular pipe 16. The latter comprises an inner polymeric tube 18, an armor layer 20 of armor threads, this armor layer 20 being covered with an outer polymeric sheath 22. The mounting end 24 has been fitted into the inner polymeric tube 18.

Furthermore, the connector 10' comprises a sleeve 28' which extends concentrically around the mounting end 24. The sleeve 28' is completely analogous to that which is shown in FIGS. 1 and 2. The sleeve 28'is fixed securely to the connection end 26 by way of fixing means 52 of the screw and nut or equivalent type.

Moreover, the inner polymeric tube 18 exhibits a free inner edge 42 whereas the outer polymeric sheath 22 exhibits a free outer edge 44; the two free edges 42, 44, then extending substantially edge to edge, while the armor 20 exhibits free ends 46 of armor threads which extend beyond the gap between free edges 42, 44 and which are folded back against the outer polymeric sheath 22. The flexible tubular pipe 16 end 14 is thus prepared before being fitted onto the mounting end 24.

Thereafter, an epoxy mixture of the aforesaid type is injected under pressure into the deformable leaktight annular chamber 38' by way of the filling orifice 40' and of an appropriate pump. FIG. 3 shows the connector 10' where the deformable leaktight annular chamber 38 has been lined with the polymer material and expanded as is illustrated in FIG. 2.

The annular strip 36' has therefore been parted radially from the inner surface 30' so as to compress respectively against the mounting end 24, and the free part 50 of the end 14. This free part 50 consists respectively and successively of the inner polymeric tube 18, of the armor layer 20, of the outer polymeric sheath 22 and of the free ends 46 of armor threads 20. Furthermore, the pressure of the epoxy mixture has also been maintained in the deformable leaktight annular chamber 38', until the mixture sets hard and forms a fully cross-linked polymer.

The free part 50 is thus clamped between the mounting end 24 and the annular strip 36' of the leaktight annular chamber 38'. Here again, the annular strip 36', by virtue of its ductility, hugs the asperities of the outer polymeric sheath 22 and of the free ends 46 of armor threads 20 while exerting a strong pressure thereon.

The connector 10' thus formed is less expensive than the connectors obtained according to the prior art, since the length of pipe to be clamped, having regard to the effectiveness of the clamping, is shorter and consequently, the length of nipple and of sleeve required ought to be smaller. Additionally, the technique using a deformable leaktight annular chamber is at one and the same time faster to implement and much less expensive than the customary clamping techniques.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method of mounting a nipple on a flexible tubular pipe end, the method comprising:
   providing a flexible tubular pipe comprising an inner polymeric tube, an armor comprising armor threads wound around said inner polymeric tube and an outer polymeric sheath around said armor;
   providing a nipple comprising a mounting end shaped and configured to be fitted into the end of said pipe; and
   providing a sleeve shaped and configured for shrouding said pipe end for clamping said pipe end onto said mounting end;
   forming a deformable leaktight annular chamber inside said sleeve, said annular chamber being shaped and configured to surround said pipe end;
   providing said armor cropped at said pipe end so as to release free ends of armor threads of said armor and to fold back said free ends of armor threads against said outer polymeric sheath before the shrouding of said pipe end with said sleeve; and
   injecting a pressurized fluid into said annular chamber of said sleeve to expand said annular chamber to engage and hold said free ends of armor threads gripped between said outer polymeric sheath and said sleeve.

2. The mounting method as claimed in claim 1, wherein said injected pressurized fluid comprises a material suitable for setting hard after injection and said material is injected under pressure into said annular chamber.

3. The mounting method as claimed in claim 1, wherein said pressurized fluid comprises a cross-linkable polymer material.

4. The mounting method as claimed in claim 1, further comprising mounting an annular strip of deformable material inside said sleeve to form said deformable leaktight annular chamber, said deformable leaktight annular chamber being located between said sleeve and said annular strip.

5. The mounting method as claimed in claim 1, wherein said provided nipple comprises another mounting end opposite from said mounting end and the mounting method further comprises providing another pipe exhibiting another respective pipe end; and
   fitting said other mounting end into said other pipe end, while shrouding said pipe ends with said sleeve.

6. A flexible tubular pipe connector comprising a nipple configured to be mounted at an end of a flexible tubular pipe, said nipple comprising a mounting end configured to be fitted into an inner wall of said end of said pipe, said connector further comprising a sleeve configured for shrouding said pipe end and for clamping said pipe end onto said mounting end;

said sleeve comprises a deformable leaktight annular chamber enclosed within said sleeve and an inner surface of said sleeve delimited by two inner annular rims located respectively at the two longitudinal ends of said sleeve, said two inner annular rims projecting inwardly from said inner surface toward said mounting end, said sleeve being configured to surround an outer wall of said pipe end; and a pressurized fluid injected into said leaktight annular chamber to expand said chamber by the injecting sufficiently to hold said pipe end between said sleeve and said mounting end of said nipple.

7. The pipe connector as claimed in claim 6, wherein said pressurized fluid is a hardenable material which sets hard in said leaktight annular chamber.

8. The pipe connector as claimed in claim 7, wherein said hardenable material is a cross-linkable polymer material.

9. The pipe connector as claimed in claim 6, wherein said sleeve has an inner surface, said sleeve comprises an annular strip of deformable material mounted inside said sleeve inner surface, such that said annular strip forms said leaktight annular chamber with said sleeve inner surface.

10. The pipe connector as claimed in claim 9, wherein said annular strip of deformable material has two opposite circular edges, and said two circular edges are held in a leaktight manner against said sleeve inner surface.

11. The pipe connector as claimed in claim 9, wherein said annular strip is comprised of a copper alloy.

12. The pipe connector as claimed in claim 6, wherein said connector is configured for connecting to another pipe end;

said nipple further comprises another mounting end opposite from said mounting end, said other mounting end being configured to be fitted into said other pipe end, and said sleeve being configured to shroud both said pipe ends.

13. A flexible tubular pipe connector and a flexible tubular pipe, said flexible tubular pipe connector comprising a nipple configured to be mounted at an end of said flexible tubular pipe, wherein said pipe comprises an inner polymeric tube;

an armor comprising armor threads wound around said inner polymeric tube; and an outer polymeric sheath around said armor;

said armor threads exhibiting free ends which extend from said outer polymeric sheath and are folded back against said outer polymeric sheath;

said nipple comprising a mounting end configured to be fitted into said end of said pipe, said connector further comprising a sleeve configured for shrouding said pipe end and for clamping said pipe end onto said mounting end;

said sleeve comprising a deformable leaktight annular chamber situated inside said sleeve and said pipe end; and a pressurized fluid being injected into said leaktight annular chamber to expand said chamber by the injecting sufficiently to hold said free ends of said armor threads gripped between said outer polymeric sheath and said sleeve.

14. The pipe connector and the pipe as claimed in claim 13, wherein said pressurized fluid is a hardenable material which sets hard in said leaktight annular chamber.

15. The pipe connector and the pipe as claimed in claim 14, wherein said hardenable material is a cross-linkable polymer material.

16. The pipe connector and the pipe as claimed in claim 13, wherein said sleeve has an inner surface, said sleeve comprising an annular strip of deformable material mounted inside said sleeve inner surface, such that said annular strip forms said leaktight annular chamber with said sleeve inner surface.

17. The pipe connector and the pipe as claimed in claim 16, wherein said annular strip of deformable material has two opposite circular edges, and said two circular edges are held in a leaktight manner against said sleeve inner surface.

18. The pipe connector and the pipe as claimed in claim 16, wherein said annular strip is comprised of a copper alloy.

19. The pipe connector and the pipe as claimed in claim 13, wherein said connector is configured for connecting to another pipe end;

said nipple further comprising another mounting end opposite from said mounting end, said other mounting end being configured to be fitted into said other pipe end, and said sleeve being configured to shroud both said pipe ends.

* * * * *

UNITED STATES PATENT AND TRADEMARK OFFICE
CERTIFICATE OF CORRECTION

PATENT NO. : 8,419,071 B2
APPLICATION NO. : 12/677346
DATED : April 16, 2013
INVENTOR(S) : Alain Cornut Gentille It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this
First Day of September, 2015

Michelle K. Lee
*Director of the United States Patent and Trademark Office*